US010046504B2

United States Patent

Rymann

(12) United States Patent
(10) Patent No.: US 10,046,504 B2
(45) Date of Patent: Aug. 14, 2018

(54) FLUID FLOW CONTROL DEVICE

(71) Applicant: NORGREN AG, Balterswil (CH)

(72) Inventor: Othmar Rymann, Balterswil (CH)

(73) Assignee: Norgren AG, Balterswil (CH)

( * ) Notice: Subject to any disclaimer, the term of this patent is extended or adjusted under 35 U.S.C. 154(b) by 32 days.

(21) Appl. No.: 15/032,226

(22) PCT Filed: Oct. 30, 2014

(86) PCT No.: PCT/EP2014/073310

§ 371 (c)(1),
(2) Date: Apr. 26, 2016

(87) PCT Pub. No.: WO2015/063202

PCT Pub. Date: May 7, 2015

(65) Prior Publication Data

US 2016/0271857 A1 Sep. 22, 2016

Related U.S. Application Data

(60) Provisional application No. 61/897,734, filed on Oct. 30, 2013.

(51) Int. Cl.

| | |
|---|---|
| ***F16K 5/10*** | (2006.01) |
| ***B29C 49/42*** | (2006.01) |
| ***F16K 3/32*** | (2006.01) |
| ***F16K 3/26*** | (2006.01) |
| ***F16K 5/04*** | (2006.01) |
| ***F16K 31/04*** | (2006.01) |

(52) U.S. Cl.

CPC .......... *B29C 49/4289* (2013.01); *F16K 3/262* (2013.01); *F16K 3/32* (2013.01); *F16K 5/0407* (2013.01); *F16K 5/10* (2013.01); *F16K 31/041* (2013.01)

(58) Field of Classification Search

CPC ..... B29C 49/4289; F16K 31/041; F16K 5/10; F16K 5/0407; F16K 3/262; F16K 3/32; F16K 5/12; F16K 1/54

USPC ......................... 251/206–209, 129.11; 137/1

See application file for complete search history.

(56) References Cited

U.S. PATENT DOCUMENTS 679,247 A * 7/1901 Whiting ................. B62D 5/097 137/625.24
792,928 A * 6/1905 Riess .................... F16K 5/0605 126/292

(Continued)

FOREIGN PATENT DOCUMENTS

WO 2009135490 A2 11/2009
WO 2014199302 A2 12/2014

*Primary Examiner* — John Bastianelli

(74) *Attorney, Agent, or Firm* — The Ollila Law Group LLC

(57) ABSTRACT

The Application describes a throttle and a method for controlling a fluid flow via a throttle . The throttle includes an inlet (618) in communication with a pressurized gas source, an outlet (610) including a selected output orifice (612), and an orifice sleeve (606) including a plurality of output orifices (612*a*, 612*b*, 612*c*, 612*d*) from which a selected output orifice (612) may be selected by rotating the orifice sleeve (606). The throttle may further include a piston (604) movable across a surface area of the selected output orifice (612), and a motor operable to move the piston (604) across the surface area of the selected output orifice (612).

10 Claims, 10 Drawing Sheets

(56) References Cited

U.S. PATENT DOCUMENTS 1,056,344 A * 3/1913 Lester ................. F16K 37/0016 137/556.6
2,750,929 A * 6/1956 Bronson .................. B64D 1/04 137/505.13
2,868,155 A * 1/1959 Phillips ..................... F15B 7/00 116/269
3,047,015 A * 7/1962 Buck ....................... F15B 11/04 137/614.17
3,298,396 A * 1/1967 Gressman ............ G05D 11/006 137/614
3,406,705 A * 10/1968 Meyer ..................... F16K 3/243 137/207
3,558,100 A * 1/1971 Hulsey .................. F16K 5/0435 251/207
3,612,102 A * 10/1971 Hulsey ...................... F16K 5/10 137/625.3
5,520,217 A * 5/1996 Grawunde .......... F15B 13/0435 137/625.63
6,808,162 B2 * 10/2004 Tranovich ............. F16K 5/0407 251/121

* cited by examiner

FLUID FLOW CONTROL DEVICE

TECHNICAL FIELD

The Application is related to the field of fluid flow control, and more particularly, to a throttle.

BACKGROUND OF THE APPLICATION

Blow-molding is a process for molding a preform part into a desired product. The preform is in the general shape of a tube with an opening at one end for the introduction of pressurized gas, typically air; however, other gases may be used. One specific type of blow-molding is stretch blow-molding (SBM). In typical SBM applications, both low and high-pressure gas is used to expand the preform into a mold cavity. The mold cavity comprises the outer shape of the desired product. SBM can be used in a wide variety of applications; however, one of the most widely used applications is in the production of Polyethylene terephthalate (PET) products, such as drinking bottles.

Typically, the SBM process uses a low-pressure fluid supply along with a stretch rod that is inserted into the preform to stretch the preform in a longitudinal direction and radially outward and then uses a high-pressure fluid supply to expand the preform into the mold cavity. The low-pressure fluid supply along with the stretch rod is typically referred to as a pre-blowing phase of the molding cycle. The high-pressure fluid supply that expands the preform into the mold cavity is typically referred to as the blowing phase of the molding cycle. The low-pressure and high-pressure fluid supplies can be controlled using blow-mold valves. The resulting product is generally hollow with an exterior shape conforming to the shape of the mold cavity. The gas in the preform is then exhausted through one or more exhaust valves. This process is repeated during each blow-molding cycle.

One of the more critical steps in the molding process occurs during the pre-blowing phase. During this phase, a pressure up to approximately 12 bar (174 psi) is provided to the preform while a stretch rod simultaneously extends the preform in a longitudinal direction. During the pre-blowing phase, there is an attempt to substantially uniformly distribute the material of the preform along the longitudinal length prior to expansion of the preform against the mold cavity. If the perform experiences a sudden jump in pressure during the pre-blowing phase, uniform distribution of the perform material may not be possible. In order to uniformly distribute the perform material, the pressure inside the preform must be carefully controlled.

Simply applying a pressurized gas source to a perform through a fixed orifice, aperture, or restrictor generates a steep, abrupt increase in pressure. Example pressure profiles 102, 104, and 106 are depicted in FIG. 1. The x-axis in FIG. 1 represents time, and the y-axis represents pressure. Pressure profiles 102, 104, and 106 depict the increase in pressure inside a perform using a 4 bar, 7 bar, and 10 bar respective pressurized gas source. In each instance, pressure profiles 102, 104, and 106 approach equilibrium rapidly with the pressurized gas source in roughly the same amount of time.

It is possible to control the pressure profile inside a perform by including a throttle valve between the source of pressurized gas and the preform. For example, FIG. 2 depicts a series of pressure profiles generated during a blow-molding process in accordance with an embodiment. The x-axis in FIG. 2 represents time, and the y-axis represents pressure. Pressure profiles 202, 204, 206, 208, 210, and 212 each increase at different rates to pressure level 214, the pressure profiles being controlled via a variable throttle.

One design for a variable throttle includes an outlet orifice and a piston that may be moved to block a portion of the surface area of the outlet orifice to increase or reducing the fluid flow through the orifice. By controlling the fluid flow through the outlet orifice of the throttle, it is possible to more carefully control a pressure profile inside a preform.

In blow-molding manufacturing, it is desirable to use the same equipment with minimal adjustments to fabricate multiple bottle sizes. In operating a throttle to control a pressure profile inside a preform, a piston may be stepped or moved through a stroke profile that includes a start position, a distance to actuate, and a rate to move. If the piston can be stepped through the same stroke profile for a wide variety of products, the need to reconfigure the piston stroke during the equipment setup can be minimized. For example, a piston stroke profile may include ten rotary turns of a piston to move the piston from a nearly closed position wherein the piston covers 100% of the surface area of an orifice to a position where the rotary piston is open and covers 0% of the surface area of the orifice.

Typical blow-molding bottle sizes may vary in volume from 0.2 L to 3.0 L, providing a volume range factor of 3.0/0.2=15. Pre-blowing pressures typically range between 2 bar and 12 bar, however, providing a pressure range factor of 12/2=6. Because the volume range factor (15) and pressure range factor (6) are different, the resolution of a throttle with a single output orifice cannot provide adequate flow resolution to match the extreme range of bottle volumes from 0.2 L to 3.0 L. In other words, a throttle outlet orifice that is ideal for a 3.0 L bottle size, providing adequate flow resolution to provide a desired pressure profile when a piston is moved across the surface area of the outlet orifice, will not provide an adequate resolution for a bottle side of 0.2 L. In order to generate any of the pressure profiles depicted in FIG. 2 for a variety of bottle sizes, a manufacturer will need adequate pressure resolution for each bottle size being fabricated.

FIG. 3 depicts pressure profiles in accordance with an embodiment. FIG. 3 illustrates the difference in pressure resolution that occurs when blowing extreme bottle sizes using the same throttle orifice surface area and blow-molding valve. In FIG. 3, the x-axis represents time when a perform is filling to a pre-blowing pressure level and the y-axis represents pressure inside a preform. Curves 302 and 306 represent the pressure inside a perform for a 0.2 L bottle, and curves 304 and 308 represent the pressure inside a perform for a 1.5 L bottle. In pressure profiles 302 and 304, the piston is positioned so that the outlet orifice of the throttle is 100% open. In pressure profiles 306 and 308, the piston is positioned so that the outlet orifice of the throttle covers 10% of the surface area of the orifice. As may be seen, the difference in time between when the 0.2 L bottle reaches the pre-blowing pressure level with each of the two piston positions is represented by the double-sided arrow 310. The difference in time between when the 1.5 L bottle reaches the pre-blowing pressure level with each of the two piston positions is represented by the double-sided arrow 312. Arrow 310 is shorter than arrow 312, indicating that for the given outlet orifice, the 1.5 L bottle size has more pressure resolution than the 0.2 L bottle size. In other words, the pressure resolution of the blow-molding valve and throttle is dependent on the bottle size being blown.

FIG. 4 depicts further pressure profiles in accordance with an embodiment. FIG. 4 is similar to FIG. 3, except that pressure profile 306, the pressure profile for a 1.5 L bottle with 10% of the surface area of the outlet orifice of the throttle open, is less steep than in FIG. 3. In FIG. 4, arrows 310 and 312 are the same length, meaning that the 0.2 L bottle size has the same pressure resolution as the 1.5 L bottle size.

There is a need in the art for a throttle that is easy to configure and operate to provide resolution under a variety of conditions to finely control pressure. The present embodiments described below overcome these and other problems and an advance in the art is achieved.

SUMMARY OF THE APPLICATION

A throttle is provided according to an embodiment of the application. The throttle includes an inlet, an outlet, and an orifice sleeve. The inlet is in communication with a pressurized gas source. The outlet further includes a selected output orifice. The orifice sleeve further includes a plurality of output orifices. The selected output orifice may be selected from the plurality of output orifices by rotating the orifice sleeve.

A throttle is provided according to an embodiment of the application. The throttle includes an inlet, an outlet, a piston, a motor, and an orifice sleeve. The inlet is in communication with a pressurized gas source. The outlet further includes a selected output orifice. The piston is movable across a surface area of a selected output orifice. The motor is operable to move the piston across a surface area of the selected output orifice. The orifice sleeve further includes a plurality of output orifices. The selected output orifice may be selected from the plurality of output orifices by rotating the orifice sleeve.

A method is provided for controlling a fluid flow via a throttle including an inlet and an outlet. The method includes the step of rotating an orifice sleeve to select a selected outlet orifice. The orifice sleeve includes a plurality of output orifices from which the selected output orifice may be selected. The method further includes the step of applying a pressurized gas source to the inlet.

ASPECTS

In one embodiment of the throttle, the orifice sleeve further includes a plurality of tabs, each tab of the plurality of tabs usable to rotate the orifice sleeve.

In one embodiment of the throttle, each output orifice of the plurality of output orifices corresponds to a respective blow-molding bottle volume range.

In one embodiment of the throttle, the orifice sleeve further includes a plurality of inlet orifices, each inlet orifice of the plurality of inlet orifices corresponding to a respective outlet orifice of the plurality of outlet orifices.

In one embodiment of the throttle, the throttle further includes a piston movable to obstruct a portion of a surface area of the selected output orifice.

In one embodiment of the throttle, the throttle further includes a stepper motor operable to move the piston across the surface area of the selected output orifice.

In one embodiment of the throttle, the throttle further includes a servo motor operable to move the piston across the surface area of the selected output orifice.

In one embodiment of the method, the method further includes the step of moving a piston across a surface area of the selected output orifice.

In one embodiment of the method, moving the piston across the surface area of the selected output orifice includes operating a motor.

In one embodiment of the method, the selected output orifice corresponds to a range of blow-mold bottle volumes.

In one embodiment of the method, turning the rotary sleeve to select the selected output orifice includes selecting a tab from of a plurality of tabs, each tab of the plurality of tabs identifying an output orifice of the plurality of output orifices.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 5-11*c* and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 5:
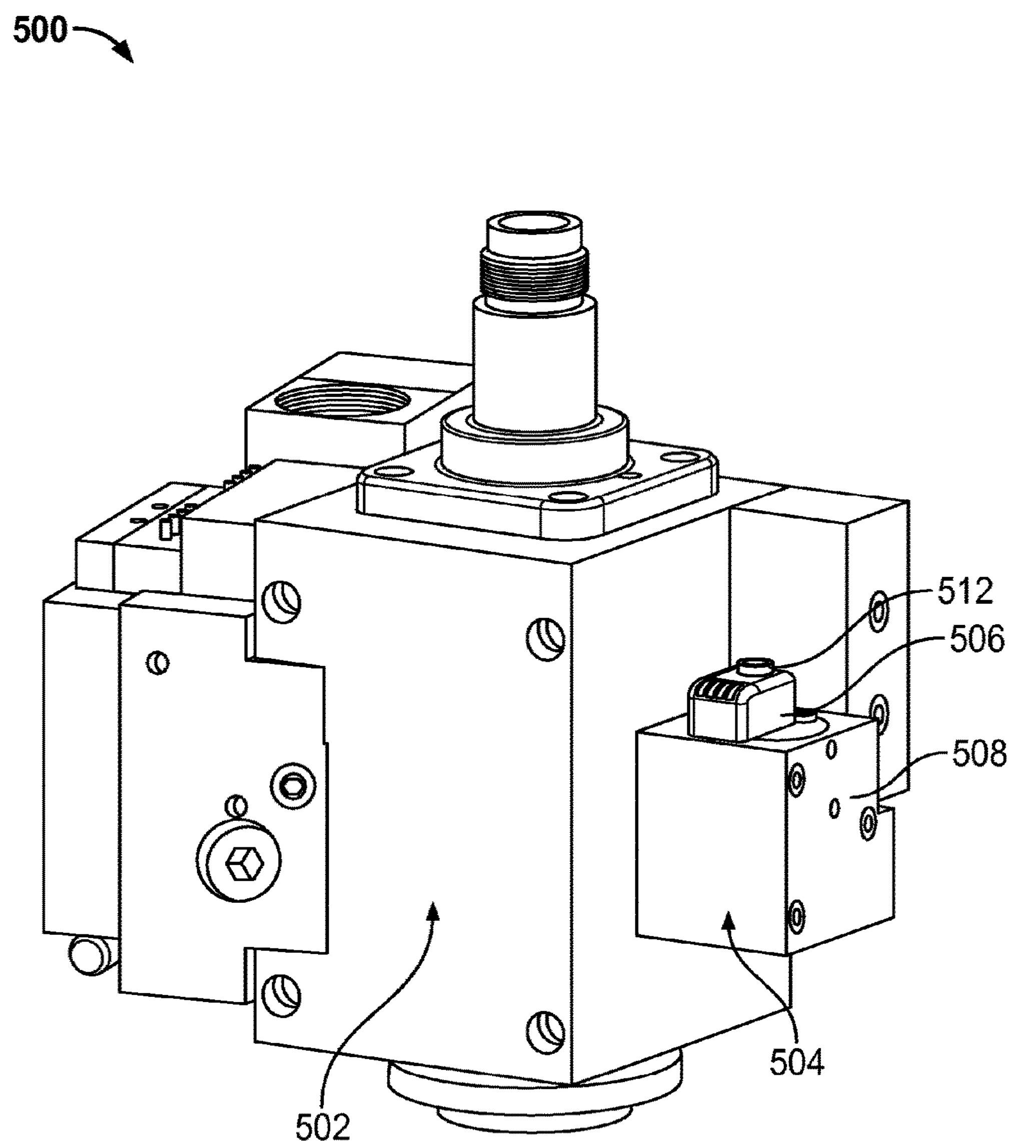
FIG. 5 depicts a perspective view of a blow-molding valve in accordance with an embodiment.

FIG. 5 depicts a blow-molding valve 500 in accordance with an embodiment of the application. Blow-molding valve 500 includes a valve body 502, a throttle 504, a motor 506, a throttle body 508, and a shaft head 512.

Blow-molding valve 500 may be used to control the flow of gas into a bottle being fabricated from a preform. For example, blow-molding valve 500 may be used to create any of the pressure profiles depicted in FIGS. 1-4. Blow-molding valve 500 may be used during the pre-blowing stage, or any later stage of blow-molding a product. Those skilled in the art will understand that blow-molding valve 500 may be used in other fluid control applications as well.

Blow-molding valve 500 includes valve body 502. Throttle 504 is coupled to body 502. Throttle 504 includes an orifice (described below) that may be opened and closed to control the pressure of gas that flows out of blow-molding valve 500 into a product being fabricated. Throttle 504 includes throttle body 508, and motor 506. Motor 506 is operable to adjust the surface area of an outlet orifice inside throttle 504, as will be described below. FIG. 5 further depicts shaft head 512.

Figure 6:
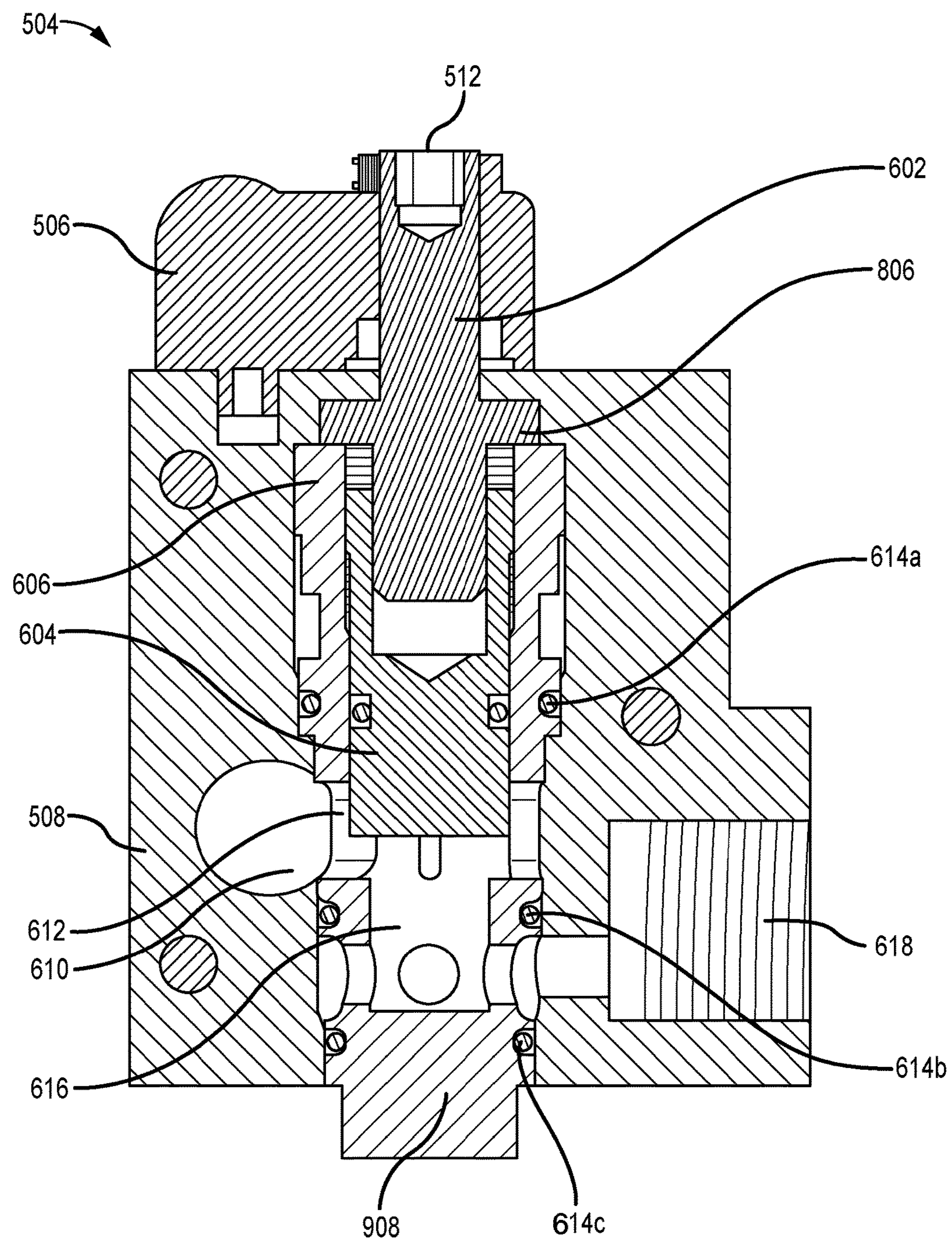
FIG. 6 depicts a cross-sectional view of a pressure throttle in accordance with an embodiment.

FIG. 6 depicts a cross-section of a throttle in accordance with an embodiment of the application. Throttle 504 includes motor 506, throttle body 508, a motor shaft 602 including shaft head 512, a piston 604, an orifice sleeve 606, a fluid inlet 618, a fluid outlet 610, selected output orifice 612, seals 614*a*, 614*b*, and 614*c*, and a fluid chamber 616. Pressure throttle 504 may be used to control the flow of fluid, including gas, liquid, or a combination thereof, that enters fluid inlet 618 and exits fluid outlet 610. While pressure throttle 504 is described within the context of a blow-molding application below, those skilled in the art will understand that pressure throttle 504 may be used in other fluid control applications as well.

It may be seen in FIG. 6 that motor shaft 602, piston 604, and orifice sleeve 606 are substantially enclosed inside of throttle body 508. An example embodiment of motor shaft 602 is provide in FIG. 7, an example embodiment of piston 604 is provided in FIG. 8, and an example embodiment of orifice sleeve 606 is provided in FIG. 9, as further described below.

Motor shaft 602 may be rotated with motor 506 or manually to displace piston 604 up and down with respect to orifice sleeve 606 during a blow-molding cycle. Piston 604 is be moved up or down with respect to the central axis of orifice sleeve 606 to vary the surface area of the selected outlet orifice 612, thereby operating the throttle 504.

Orifice sleeve 606 includes a hollowed out center portion that forms a substantially cylindrical inner surface stretching from threads 904 to a solid end 908. A pressure chamber 616 is formed from the space that may be found inside orifice sleeve 606 between piston 604 and solid end 908. In FIG. 6, orifice sleeve 606 may be rotated to place pressure chamber 616 in communication with inlet 618 and outlet 610.

Any of outlet orifices 612*a*, 612*b*, 612*c*, or 612*d* may be selected by rotating the orifice sleeve 606 until the selected outlet orifice faces fluid outlet 610. Pressurized fluid may enter throttle 504 through inlet orifice 618, pass through the pressure chamber 616, and out of outlet orifice 612. Piston 604 may move up or down to increase or reduce the surface area of the selected inlet orifice, thereby controlling the pressure of the fluid passing through throttle 504.

Throttle 504 further includes seals 614*a*, 614*b*, and 614*c*. Seals 614*a*, 614*b*, and 614*c* may be o-rings or any other type of sealing member commonly known to those skilled in the art. Seals 614*a*, 614*b*, and 614*c* may prevent leaks from fluid chamber 616.

Figure 7:
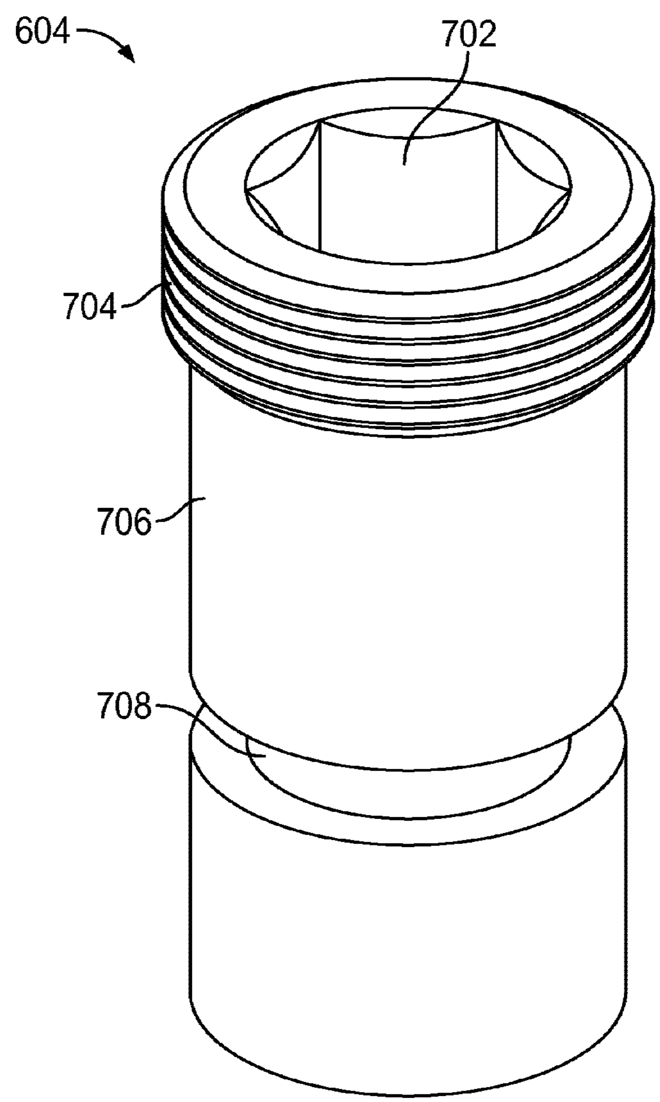
FIG. 7 depicts a perspective view of a piston in accordance with an embodiment.

FIG. 7 depicts an example embodiment of piston 604 in accordance with an embodiment. Piston 604 includes a hex head 702, threads 704, a shaft stem 706, and an annular inset 708. Shaft stem 706 defines the substantially cylindrical body of piston 604. Piston 604 includes a section of male threads 704 that translate the rotation of piston 604 into linear piston 604 displacement in the axial direction. Piston 604 has a stroke along the longitudinal axis of orifice sleeve 606 that may be used to modulate the surface area of selected output orifice 612. In an embodiment, piston 604 may have a stroke of 0-10 mm.

Figure 8:
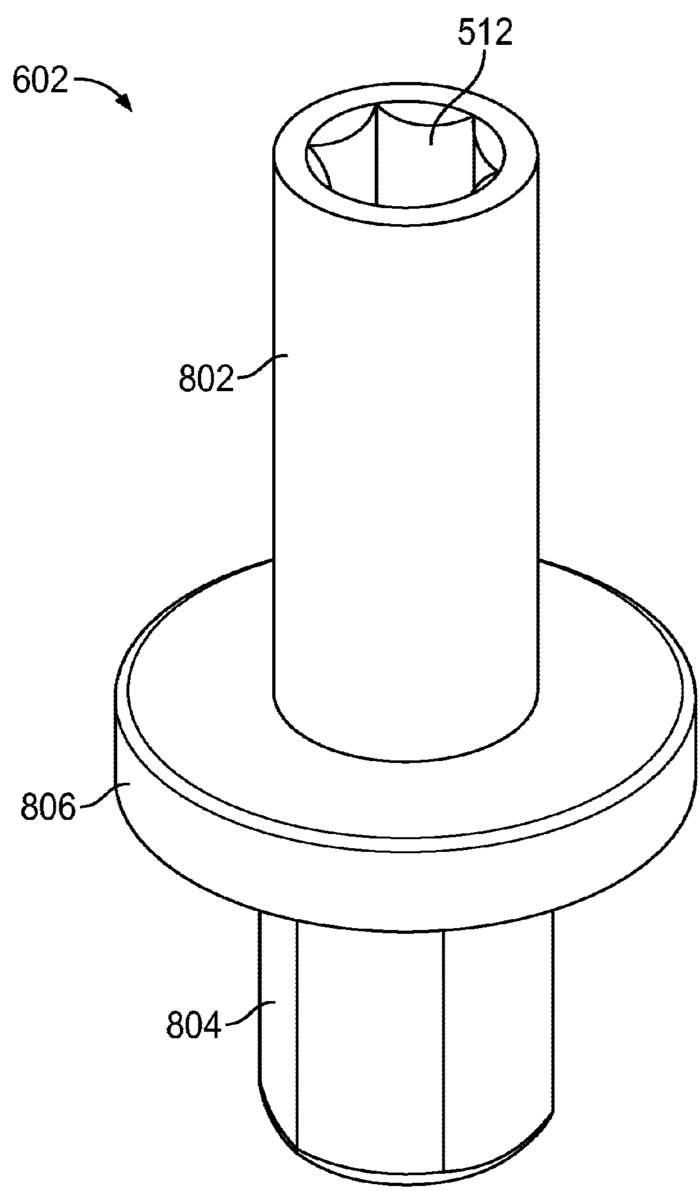
FIG. 8 depicts a perspective view of a motor shaft in accordance with an embodiment.

FIG. 8 depicts an example motor shaft 602 in accordance with an embodiment. Motor shaft 602 is substantially cylindrical, and includes shaft head 512, a shaft stem 802, a hex key 804 and an annular portion 806. Hex key 804 is a male hexagon fitting that can fit securely in the female hex head 702 portion of piston 604. When torque is applied to motor shaft 602 via shaft head 512 or shaft stem 802, motor shaft 602 provides rotational force via hex key 804 to rotate piston 604. Annular portion 806 is designed to secure motor shaft 602 inside throttle 504. For example, it may be seen in FIG. 6 that annular portion 806 may be positioned between throttle body 508 and the top of orifice sleeve 606 within the throttle 504 assembly.

Figure 9:
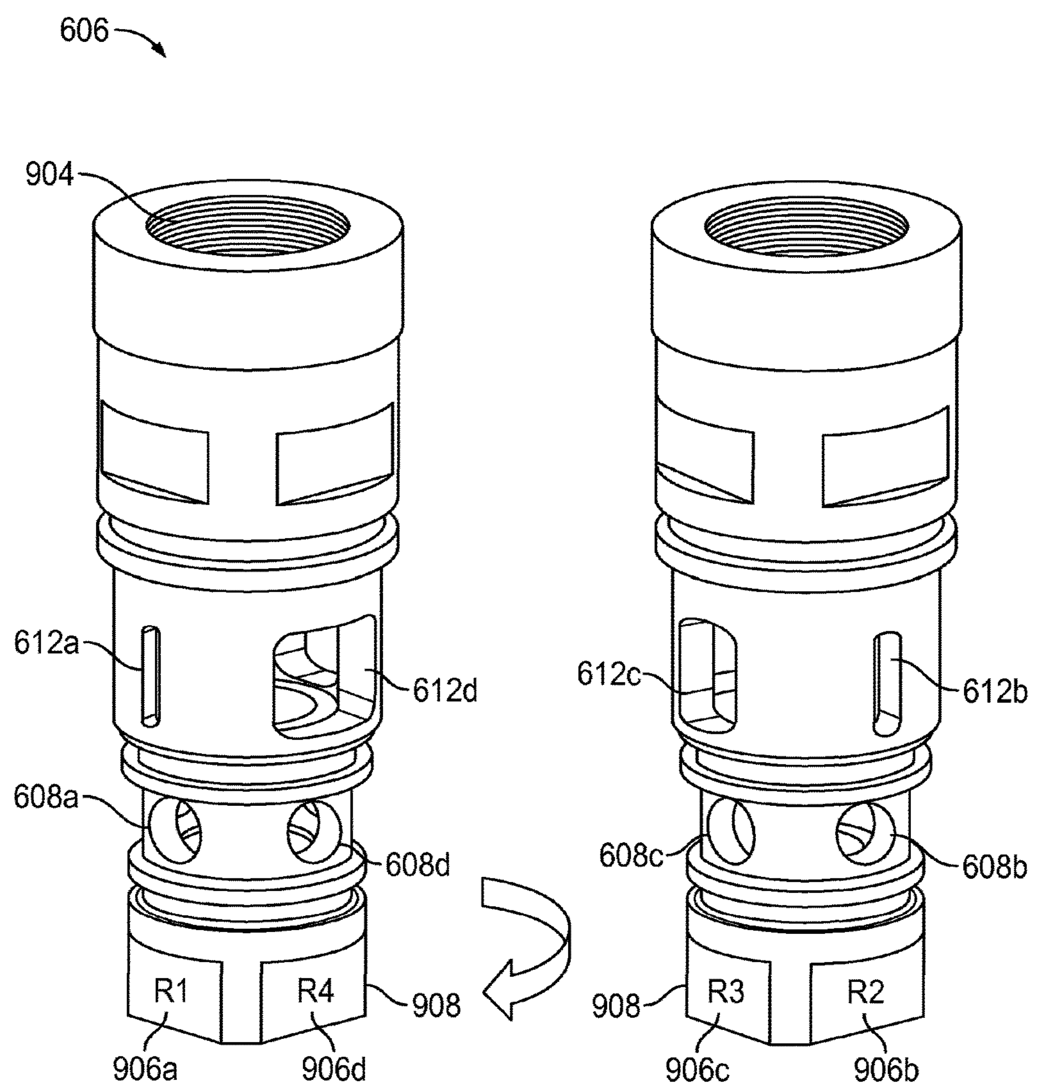
FIG. 9 depicts perspective views of an orifice sleeve in accordance with an embodiment.

FIG. 9 depicts two perspective views of an example orifice sleeve 606 in accordance with an embodiment. Orifice sleeve 606 includes a substantially cylindrical exterior surface. At one end, orifice sleeve 606 is open and includes threads 904, and at the other end, solid end 908, orifice sleeve 606 is closed. Female threads 904 may couple to male piston threads 704 to position and align piston 604 inside of orifice sleeve 606. As piston 604 is rotated inside orifice sleeve 606, piston 604 may travel up and down via threads 904.

Orifice sleeve 606 includes inlet orifices 608*a*, 608*b*, 608*c*, and 608*d*, outlet orifices 612*a*, 612*b*, 612*c*, and 612*d*, threads 904, and tabs 906*a*, 906*b*, 906*c*, and 906*d*. Inlet orifice 608*a*, outlet orifice 612*a*, and tab 906*a* are aligned along the length of orifice sleeve 606. Inlet orifice 608*b*, outlet orifice 612*b*, and tab 906*b* are aligned the length of orifice sleeve 606. Inlet orifice 608*c*, outlet orifice 612*c*, and tab 906*c* are aligned along the length of orifice sleeve 606. Inlet orifice 608*d*, outlet orifice 612*d*, and tab 906*d* are aligned along the length of orifice sleeve 606. While example orifice sleeve 606 includes four inlet orifices and four outlet orifices, those skilled in the art will understand that any number of orifices may be used.

Orifice sleeve 606 includes tabs 906*a*, 906*b*, 906*c*, and 906*d* along its solid end 908. Tabs 906*a*, 906*b*, 906*c*, and 906*d* are straight segments inset into orifice sleeve 606 at solid end 908 to create a cross section at solid end 908 a square with angled corners. The tabs 906*a*, 906*b*, 906*c*, and 906*d* may be used to easily grip orifice sleeve 606 to rotate orifice sleeve 606 about its center axis manually or via any automated means known to those skilled in the art. Rotating tabs 906*a*, 906*b*, 906*c*, and 906*d* rotates orifice sleeve 606 to expose the desired outlet orifices 612*a*, 612*b*, 612*c*, and 612*d* to fluid outlet 610, thereby providing an additional level of adjustment to throttle 504. Because tabs 906*a*, 906*b*, 906*c*, and 906*d* are non-cylindrical, their shapes may be further used to confirm proper alignment of the selected orifice 612 to the outlet 610. In FIG. 9, it may be seen that tabs 906*a*, 906*b*, 906*c*, and 906*d* include labels "R1," "R2," "R3," and "R4," which may allow a user to select the desired outlet orifice. Tabs 906*a*, 906*b*, 906*c*, and 906*d* make orifice sleeve 606 easy to reconfigure in a blast block that must accommodate different bottle sizes.

Outlet orifices 612*a*, 612*b*, 612*c*, and 612*d* are oriented so that their surface areas are perpendicular to the radial direction from the center of orifice sleeve 606. In an embodiment, outlet orifices 612*a*, 612*b*, 612*c*, and 612*d* may be oblong and oriented so that their longest dimensions, or heights, are parallel to the longitudinal axis of the orifice sleeve 606. When combined with the movement of piston 604 along the central axis of orifice sleeve 606, this may advantageously allow for the greatest possible pressure resolution of throttle 504. It may be seen in FIG. 9 that example outlet orifices 612*a*, 612*b*, 612*c*, and 612*d* each feature a different surface area, with the outlet orifices having substantially the same height dimension, but differing in the size of their widths. Advantageously, each outlet orifice 612*a*, 612*b*, 612*c*, and 612*d* may provide a maximum pressure resolution using the same piston 604 stroke profile. Those skilled in the art will understand, however, that any shape of outlet orifice may be used.

By designing each of the surface areas of outlet orifices 612*a*, 612*b*, 612*c*, and 612*d* to match a different range of bottle volumes, it is possible to provide adequate pressure resolution to blow-mold high quality bottles over a wide range of sizes.

Figure 10:
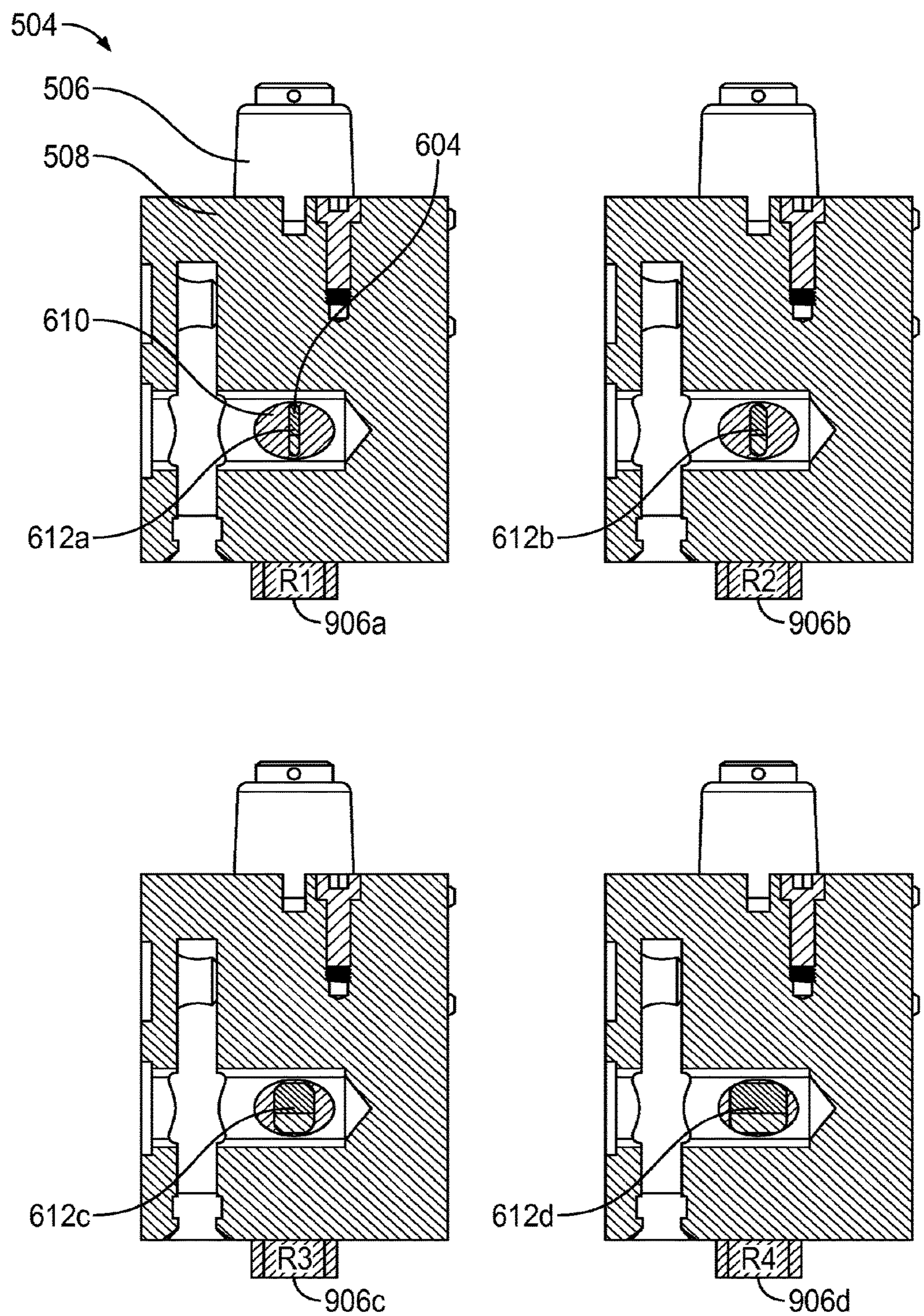
FIG. 10 depicts a side view of a pressure throttle in accordance with an embodiment.

FIG. 10 depicts four side views of throttle 504 in accordance with an embodiment. FIG. 10 depicts the fluid outlet 610 of throttle 504 with each of the four outlet orifices 612*a*, 612*b*, 612*c*, and 612*d* selected as selected output orifice 612. In the example of FIGS. 9 and 10, the surface area of the fluid orifices increase from outlet orifice 612*a* to 612*d*, with 612*d* being the largest. While each of outlet orifices 612*a*, 612*b*, 612*c*, and 612*d* have substantially the same height along the longitudinal dimension of orifice sleeve 606, the outlet orifices vary in width. In each of the depictions, piston 604 is depicted in the same longitudinal position. Advantageously, it may be seen that turning orifice sleeve 606 allows for a quick configuration of selected output orifice 612.

Figure 11A:
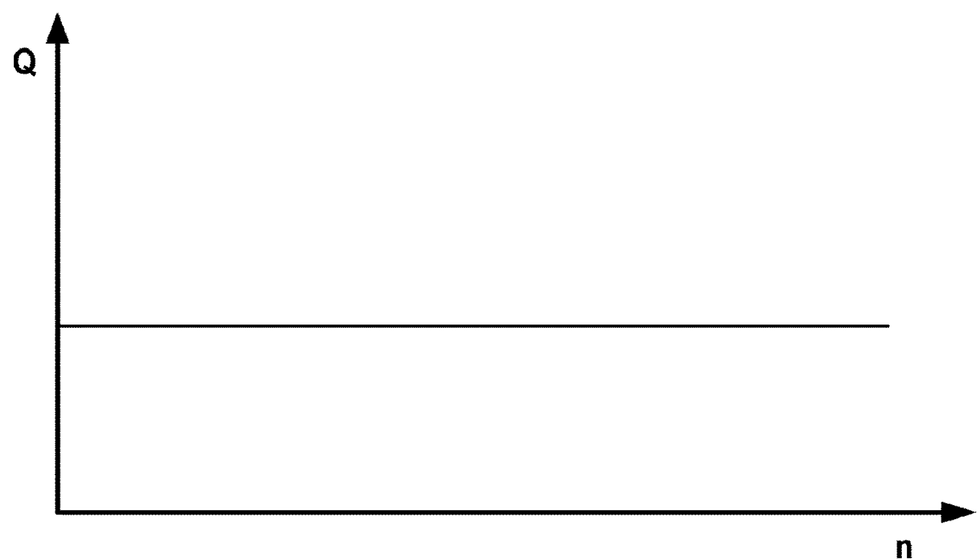
FIG. 11*a* depicts a fluid flow profile in accordance with an embodiment.
Figure 11B:
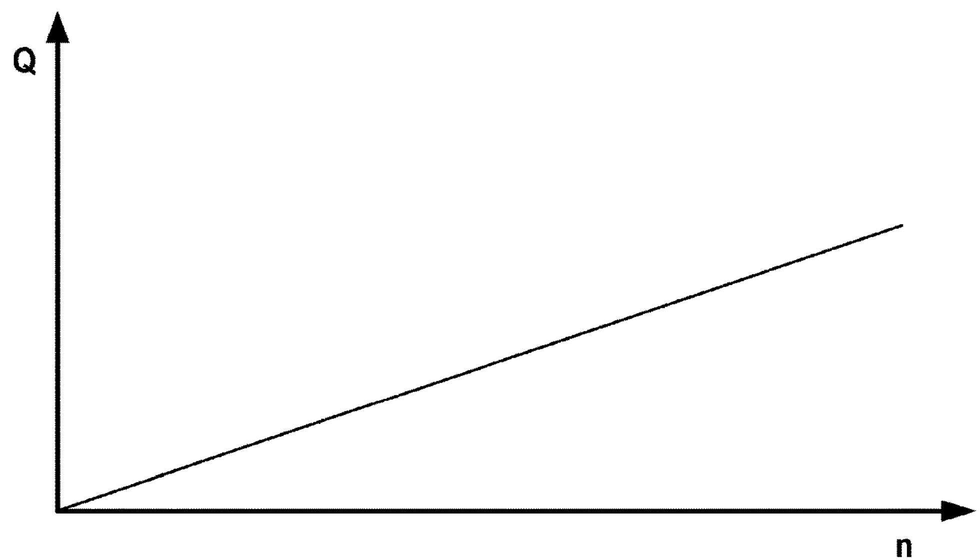
FIG. 11*b* depicts a fluid flow profile in accordance with an embodiment.
Figure 11C:
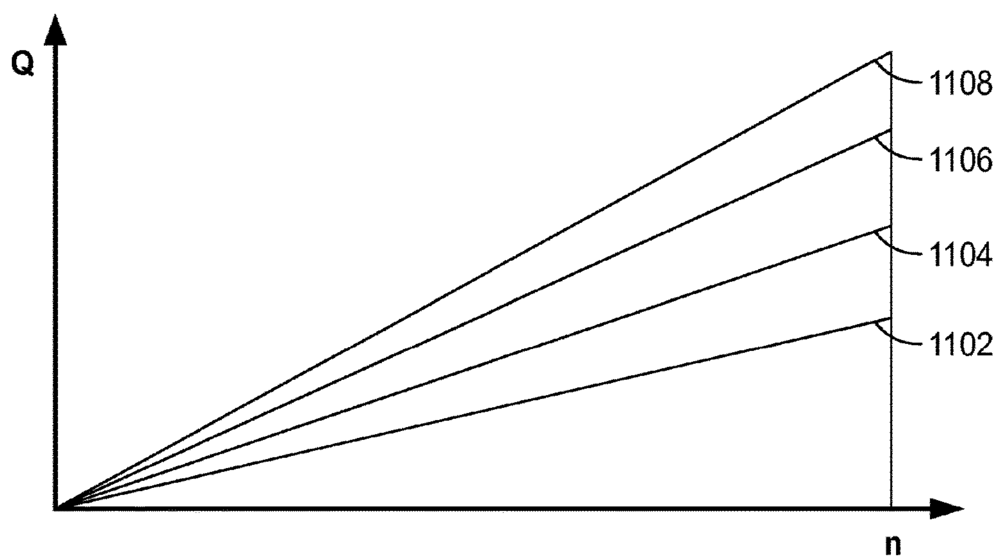
FIG. 11*c* depicts a series fluid flow profiles in accordance with an embodiment.

FIGS. 11*a*, 11*b*, and 11*c* depict fluid flow Q through outlet orifices. Flow Q is a function of outlet orifice area, outlet orifice geometry, and the differential pressure on either side of the outlet surface orifice. In FIGS. 11*a*, 11*b*, and 11*c*, the flow Q is represented on the y-axis against piston position n on the x-axis. Differential pressure and geometry are held constant in FIGS. 11*a*, 11*b*, and 11*c*, so that flow Q is only a function of outlet orifice surface area.

FIG. 11*a* depicts a fluid flow Q through a single fixed orifice. FIG. 11*a* depicts the simple scenario of a single output orifice with a piston position n that does not vary. Fluid flow Q is constant under the conditions depicted in FIG. 11*a*. Using the fluid flow Q depicted in FIG. 11*a*, it may be possible to generate the pressure profiles 102, 104, and 106 depicted in FIG. 1.

FIG. 11*b* depicts a linear fluid flow Q through a single orifice with a moving piston. The surface area of the single orifice is varied at a constant pace using the moving piston to create a linear fluid flow Q. Using the fluid flow Q depicted in FIG. 11*b*, it may be possible to generate the pressure profiles 202, 204, 206, 208, 210, and 212 depicted in FIG. 2.

FIG. 11*c* depicts a multi-linear fluid flow Q through multiple orifices using a moving piston. FIG. 11*c* depicts example multi-linear fluid flows Q, including fluid flow profiles 1102, 1104, 1106, and 1108. Each fluid flow profile 1102, 1104, 1106, and 1108 represents the fluid flow through a different output orifice 612*a*, 612*b*, 612*c*, or 612*d* while the surface area is varied at a constant rate using piston 604. For example, outlet orifice 612*a* may generate fluid flow profile 1102, outlet orifice 612*b* may generate fluid flow profile 1104, outlet orifice 612*c* may generate fluid flow profile 1106, and outlet orifice 612*d* may generate fluid flow profile 1108.

Each fluid flow profile 1102, 1104, 1106, and 1108 is generated using the same piston stroke profile. For example, piston 604 may have a stroke of 10 mm. When n=0, each outlet orifice 612*a*, 612*b*, 612*c*, or 612*d* is completely obstructed so that its respective surface area is 0% open and there is no flow Q. As n increases to the right, however, the percentage of surface area open increases, and flow Q also increases. Because each outlet orifice 612*a*, 612*b*, 612*c*, or 612*d* has a different respective width, however, a similar piston position n produces a different respective flows Q.

In embodiments, motor 506 may move piston 604 at different rates or with different degrees of precision to custom-tailor a fluid flow Q or pressure profile. For example, motor 506 may be a stepper motor able to rotate piston 604 with a resolution of 0.01 of a turn. If the stroke length is 10 turns, each fluid flow profile 1102, 1104, 1106, and 1108 may have a resolution of 1000 piston positions n. With the four ranges provided by the four outlet orifice 612*a*, 612*b*, 612*c*, or 612*d* of orifice sleeve 606, throttle 504 may offer 4000 total combinations of outlet orifice and piston position.

In a further example, motor 506 may be an electric servomotor able to rotate piston 604 with a resolution of 0.0025 of a turn. With a stroke length of 10 turns, each fluid flow profile 1102, 1104, 1106, and 1108 may have a resolution of 4000 piston positions n with the four ranges provided by the four outlet orifice 612*a*, 612*b*, 612*c*, or 612*d* of orifice sleeve 606, throttle 504 may offer 16000 total combinations of outlet orifice and piston position. These examples are not intended to be limiting however, as those in the art will understand other piston actuation mechanisms and stroke profiles also possible.

Figure 1:
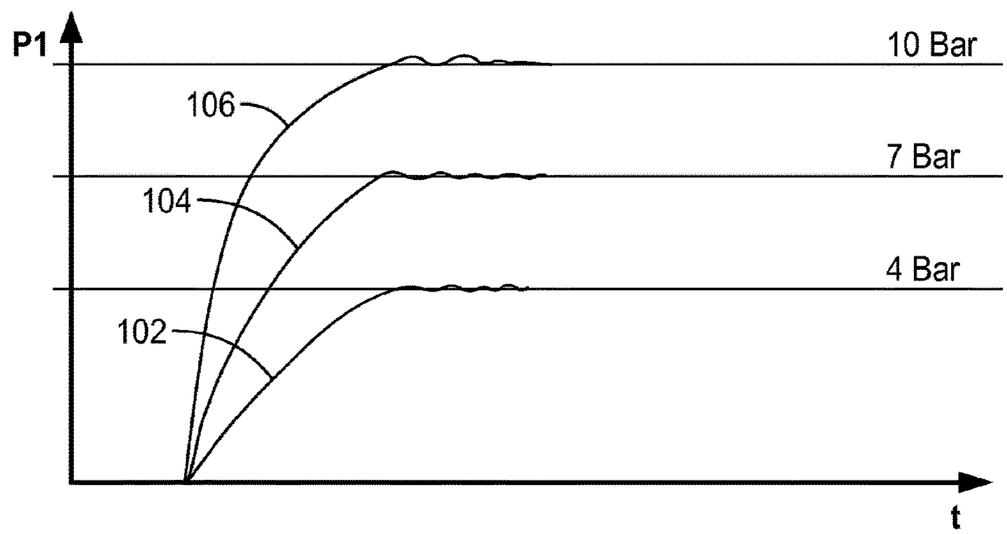
FIG. 1 depicts a series of pressure profiles in accordance with an embodiment.
Figure 2:
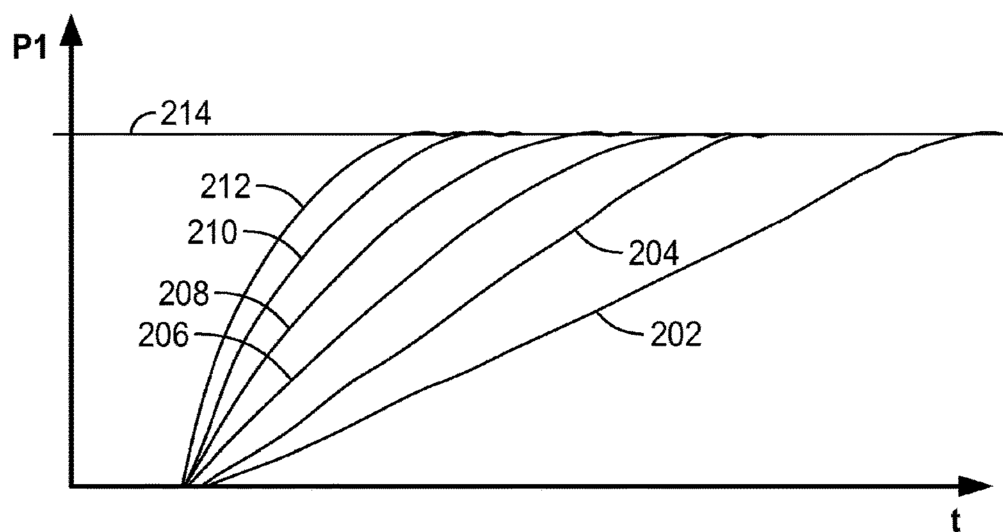
FIG. 2 depicts a series of pressure profiles in accordance with an embodiment.
Figure 3:
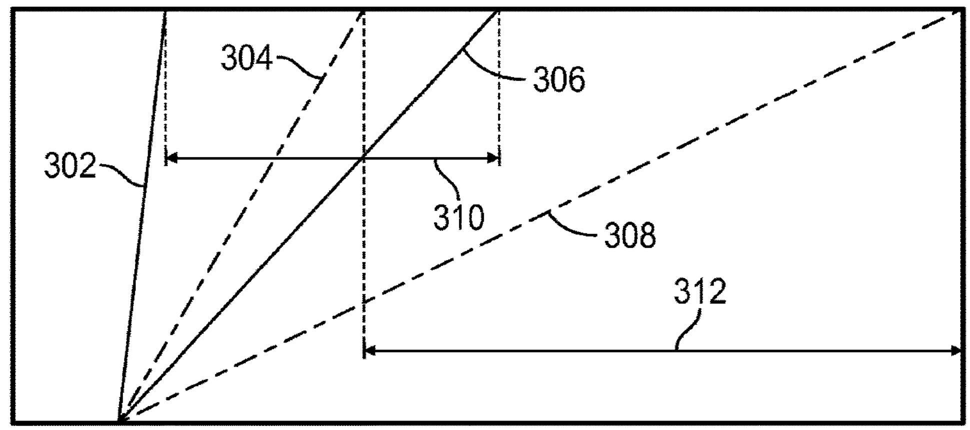
FIG. 3 depicts a series of pressure profiles in accordance with an embodiment.
Figure 4:
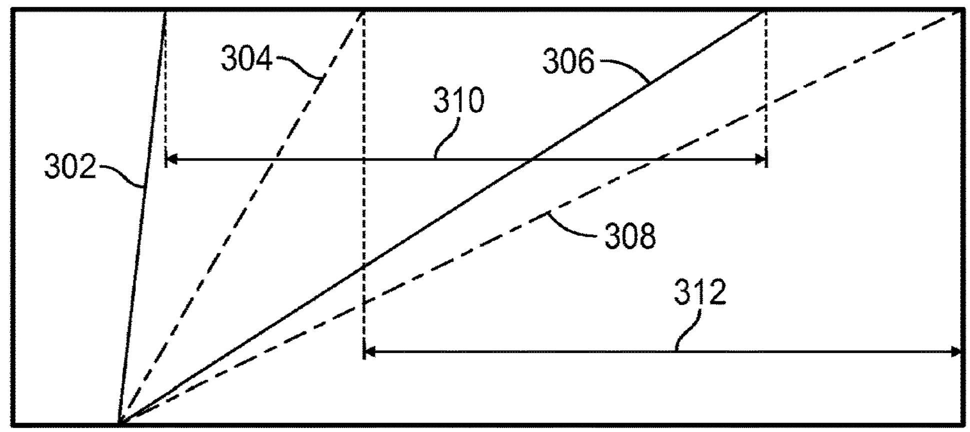
FIG. 4 depicts a series of pressure profiles in accordance with an embodiment.

Advantageously, using the fluid flow profiles 1102, 1104, 1106, and 1108 depicted in FIG. 11*c*, it may be possible to generate the pressure profiles 202, 204, 206, 208, 210, and 212 depicted in FIG. 2 for a wide range of blow-molding products and bottle volumes. The increased pressure control resolution may enable robust, repeatable results when blow-molding bottles having extreme differences in volumes. For example, it may be possible to utilize outlet orifice 612*a* to blow-mold a high quality bottle with a volume range of 0-0.75 L, to use outlet orifice 612*b* to blow-mold a high quality bottle with a volume range of 0.75 L-1.5 L, to use outlet orifice 612*c* to blow-mold a high quality bottle with a volume range of 1.5 L-2.25 L, and to use outlet orifice 612*d* to blow-mold a high quality bottle with a volume range of 02.25 L-3.0L.

The detailed descriptions of the above embodiments are not exhaustive descriptions of all embodiments contemplated by the inventors to be within the scope of the application. Indeed, persons skilled in the art will recognize that certain elements of the above-described embodiments may variously be combined or eliminated to create further embodiments, and such further embodiments fall within the scope and teachings of the application. It will also be apparent to those of ordinary skill in the art that the above-described embodiments may be combined in whole or in part to create additional embodiments within the scope and teachings of the application.

Thus, although specific embodiments of the application and examples are described herein for illustrative purposes, various equivalent modifications are possible within the scope of the application, as those skilled in the relevant art will recognize. The teachings provided herein can be applied to other devices and method, and not just to the embodiments described above and shown in the accompanying figures. Accordingly, the scope of the application should be determined from the claims.

I claim:

1. Method of controlling a fluid flow via a throttle including an inlet and an outlet, the method comprising the steps of:

rotating an orifice sleeve to select a selectable output orifice, wherein the orifice sleeve includes a plurality of outlet orifices from which the selectable output orifice may be selected, the orifice sleeve including at least one input orifice and each outlet orifice of the plurality of outlet orifices having a different surface area moving a piston across a surface area of the selected output orifice to vary the surface area of the selected output orifice by operating a motor; and applying a pressurized gas source to the inlet.

2. The method of claim 1, wherein the selectable output orifice corresponds to a range of blow-mold bottle volumes.

3. The method of claim 1, wherein turning the rotary sleeve to select the selectable output orifice includes selecting a tab from of a plurality of tabs, each tab of the plurality of tabs identifying an outlet orifice of the plurality of outlet orifices.

4. A throttle comprising:

an inlet (618) in communication with a pressurized gas source;

an outlet (610) including a selectable output orifice (612);

a piston (604) movable across a surface area of a selectable output orifice (612);

a motor (506) operable to move the piston (604) across a surface area of the selectable output orifice (612); and an orifice sleeve (606) including a plurality of outlet orifices (612*a*, 612*b*, 612*c*, 612*d*) and at least one input orifice, each outlet orifice of the plurality of outlet orifices having a different surface area, wherein the selectable output orifice (612) may be selected from the plurality of outlet orifices (612*a*, 612*b*, 612*c*, 612*d*) by rotating the orifice sleeve (606).

5. The throttle of claim 4, wherein the orifice sleeve (606) further includes a plurality of tabs (906*a*, 906*b*, 906*c*, 906*d*), each tab of the plurality of tabs (906*a*, 906*b*, 906*c*, 906*d*) identifying an outlet orifice of the plurality of outlet orifices (612*a*, 612*b*, 612*c*, 612*d*).

6. The throttle of claim 4, wherein the orifice sleeve (606) further includes a plurality of tabs (906*a*, 906*b*, 906*c*, 906*d*) usable to rotate the orifice sleeve (606).

7. The throttle of claim 4, wherein the orifice sleeve (606) further includes a plurality of inlet orifices (608*a*, 608*b*, 608*c*, 608*d*), each inlet orifice of the plurality of inlet orifices (608*a*, 608*b*, 608*c*, 608*d*) corresponding to a respective outlet orifice of the plurality of outlet orifices.

8. The throttle of claim 4, wherein the motor (506) is a stepper motor.

9. The throttle of claim 4, wherein the motor (506) is a servo motor.

10. The throttle of claim 4, wherein each outlet orifice of the plurality of outlet orifices (612*a*, 612*b*, 612*c*, 612*d*) corresponds to a respective blow-molding bottle volume range.

* * * * *